United States Patent [19]

Athenes et al.

[11] 4,402,078
[45] Aug. 30, 1983

[54] SIGNALLING SWITCHING SYSTEM IN A TIME SWITCHING NETWORK AND TIME SWITCHING NETWORK INCORPORATING SUCH A SYSTEM

[75] Inventors: Claude Athenes; Jacques E. Salle, both of Colombes, France

[73] Assignee: Thomson-CSF Telephone, Colombes, France

[21] Appl. No.: 242,304

[22] Filed: Mar. 10, 1981

[30] Foreign Application Priority Data

Mar. 11, 1980 [FR] France .................................. 80 05417

[51] Int. Cl.³ .............................................. H04J 3/02
[52] U.S. Cl. ........................................ 370/66; 364/900
[58] Field of Search ................... 340/825.11; 364/200, 364/900; 370/53, 58, 66, 110.1

[56] References Cited

U.S. PATENT DOCUMENTS

| | | | |
|---|---|---|---|
| 4,071,701 | 1/1978 | Leijonhufvud | 370/66 |
| 4,156,796 | 5/1979 | O'Neal et al. | 364/900 |
| 4,228,536 | 10/1980 | Gueldenpfennig et al. | 370/66 |

Primary Examiner—Benedict V. Safourek
Attorney, Agent, or Firm—Oblon, Fisher, Spivak, McClelland & Maier

[57] ABSTRACT

The system is constituted by a wired logic included in a signalling unit, which also has a microcomputer. This logic is connected on the one hand to the incoming and outgoing signalling junctions of a connection network and on the other to a programmed peripheral marking unit by means of which a central computer supplies correspondence data between an incoming junction channel and an outgoing junction channel.

6 Claims, 6 Drawing Figures ized 4,402,078

SIGNALLING SWITCHING SYSTEM IN A TIME SWITCHING NETWORK AND TIME SWITCHING NETWORK INCORPORATING SUCH A SYSTEM

TECHNICAL FIELD OF THE INVENTION

The invention relates to a signalling switching system in a time switching network used more particularly in telephone exchanges.

A time switching network permits the exchange of communications or calls between incoming junctions and outgoing junctions on which information is transmitted by pulse-code modulation (PCM).

According to International CCITT standards (notice G 732) an PCM-type junction has frames formed by 32 time-slots whereof the first IT0 and the seventeenth IT16 are allocated to signalling and are called signalling channels, the time intervals IT1 to IT15 and IT17 to IT32 being allocated to 30 simultaneous multiplexed calls and are called speech channels. Each of the time-slot comprises an 8 bit sample. The frames are grouped into multi frame, each comprising 16 frames numbered from 0 to 15 and the IT0 of each frame comprises the frame locking signalling (notice G 732, sections 2.3 and 2.4).

The time-slot IT16 are allocated to the channel-wise signalling relative to the calls in accordance with the following table in which the first four bits of the sample are designated IT16A and the four last bits IT16B.

| Speech channel | Speech channel number in binary code | Associated signalling channel | Signalling channel content. |
|---|---|---|---|
| IT0 | 0 0000 | IT16A field 0 | 0000 |
| IT1 | 0 0001 | IT16A field 1 | abcd |
| IT2 | 0 0010 | IT16A field 2 | abcd |
| IT15 | 0 1111 | IT16A field 15 | abce |
| IT16 | 1 0000 | IT16B field 0 | xyxx |
| IT17 | 1 0001 | IT16B field 1 | abcd |
| IT30 | 1 1110 | IT16B field 14 | abcd |
| IT31 | 1 1111 | IT16B field 15 | abce | x is a reserve bit fixed at 1 if it is not used, y indicates a multi-frame locking loss and a,b,c and d are in each case signalling bits corresponding to a speech channel (notice G 732, section 4). The IT16 of frame TR0 contains the multi-frame locking signalling (0000 xyxx).

STATE OF THE PRIOR ART

In known time switching networks, speech channels are switched by a connection network controlled by a central control unit incorporating at least one computer and the signalling is switched by a signalling unit incorporating a microprocessor controlled by the central unit and connected to the connection network by at least one incoming signalling junction JSe and an outgoing signalling junction JSs having all the signalling channels IT16 relative to the speech channels switched into the connection network.

Assuming that the content of IT2 of incoming junction Je4 is switched into IT30 of outgoing junction Js28 by the connection network, if it is also desired to switch the signalling, it is necessary for the content of the signalling channel associated with IT2 and located in IT16A of frame 2 of junction Je4 (see above table) to be transferred into the signalling channel associated with IT30 and located in IT16B of frame 14 of junction Js28.

OBJECT OF THE INVENTION

The system according to the invention makes it possible to free the microprocessor of the signalling unit from the switching of signalling channels by means of a wired logic, without blocking in the strict sense for normal capacities, with a very limited, constant time lag (without phase distortion) and without path investigation.

SUMMARY OF THE INVENTION

According to a feature of the invention, in a time switching network provided with at least one central computer supplying by means of a peripheral marking unit correspondence data each determining the connection of one channel of an incoming junction with one channel of an outgoing junction, which is also provided with a connection network permitting the exchange of calls between N incoming junctions and N outgoing junctions and which supplies and receives in the form of n incoming signalling junctions and n outgoing signalling junctions (n being an integer immediately above or equal to N/r) the signalling data respectively contained in the frames of the N incoming junctions and the N outgoing junctions of the network at a rate of r per junction and which is finally provided with a signalling unit incorporating a microcomputer connected to the central computer, the signalling switching system forming part of the signalling unit is constituted by a wired logic which on the one hand receives and supplies the signalling junctions and the other hand has two inputs connected to two outputs of the peripheral marking unit supplying to it at the first input the address ITxJe of one channel of an incoming junction and to the second input the address ITyJs of the channel of the outgoing junction to which the channel ITxJe is connected.

DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
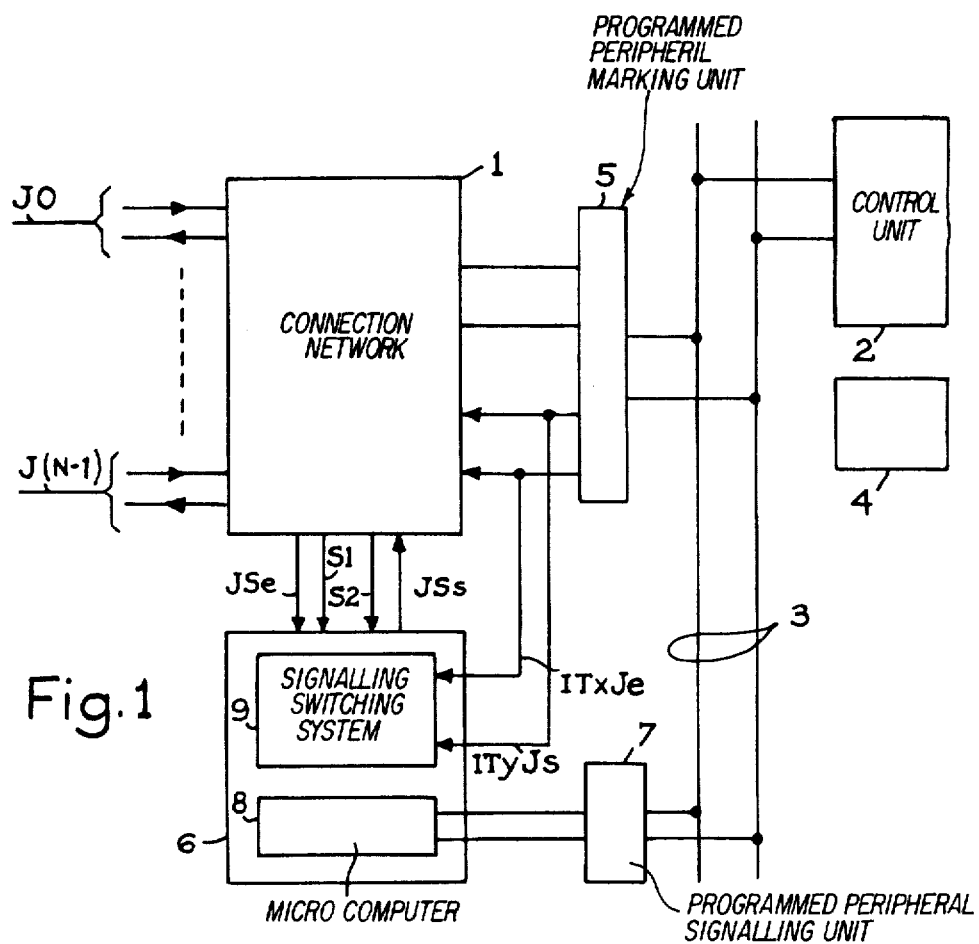
FIG. 1 diagrammatically a time switching network incorporating a signalling switching system according to the invention.

Firstly, the time switching network shown in FIG. 1 essentially comprises a connection network 1 having at least one time switching stage and optionally one or more spatial switching stages. To this network are connected N junctions J0 to J(N-1) each having an incoming junction Je and an outgoing junction Js, a control unit 2 having at least one computer connected to a peripheral unit access busbar 3, a clock and a programmed peripheral marking unit 5 connected on the one hand to busbar 3 AND on the other hand to the connection network 1 to which it supplies the addresses of two connected channels, firstly that of an incoming channel ITxJe designating the xth channel of the eth incoming junction and the second that of an outgoing channel ITyJs which designates the yth channel of the sth junction, x and y being between 0 and 31 and e and s between 0 and N−1. In addition, this time switching network has a signalling unit 6 connected to busbar 3 by a programmed peripheral signalling unit 7 and which is connected to the connection network via at least one signalling junction comprising an incoming junction JSe and an outgoing junction JSs, the connection network supplying it with a synchronizing signal S1 relative to JS3 and a synchronizing signal S2 relative to JSs.

This signalling unit is constituted by a microcomputer 8 fulfilling the functions of signalling unit, receiver and transmitter controlled by unit 2 and, according to the invention, by a signalling switching system 9 realised by means of a wired logic receiving signals JSe, S1 and S2 from connection network 1, which supplies to it the signal JSs and which receives the addresses ITxJe and ITyJs from two connected channels coming from the programmed peripheral marking unit 5.

Figure 2:
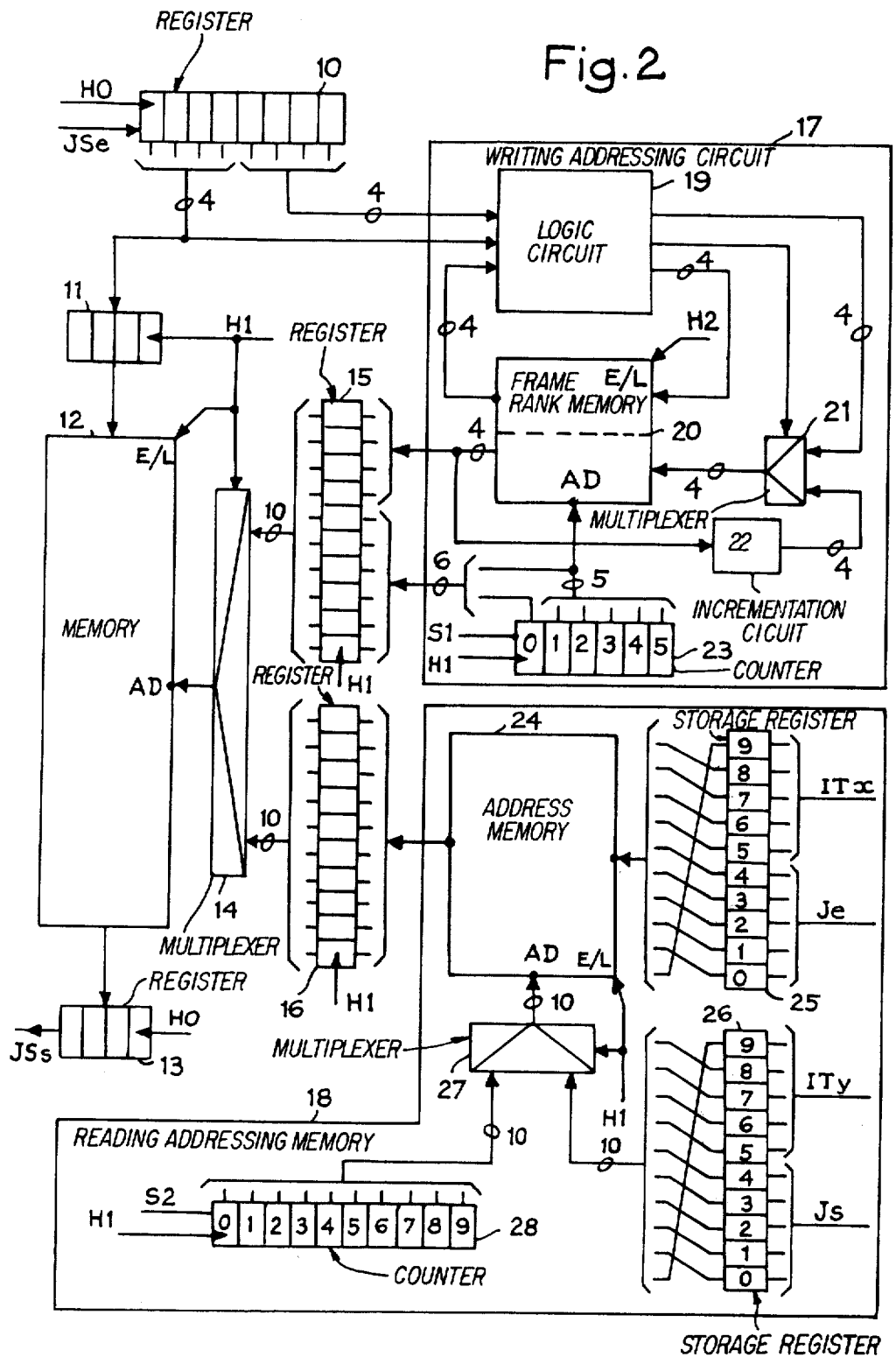
FIG. 2 an embodiment of the signalling switching system in a network having at the most 32 incoming junctions and 32 outgoing junctions, with an incoming signalling junction and an outgoing signalling junction.

The signalling switching system shown in FIG. 2 corresponds to the case where the number N of junctions in the network is equal to or less than 32. In this case, a signal signalling junction is sufficient for containing all the signalling data. To this end, the rank of the incoming or outgoing junction respectively is made to correspond with the rank of the channel of the field of signalling junction JSe or JSs respectively. Thus, the signalling junction JSe or JSs contains all the signalling data contained in IT16 of the incoming or outgoing junctions.

For example, in the case of JSe, the first channel IT0 of the first frame TR0 of JSe contains the sample of IT16 of frame TR0 of incoming junction JE0, the second or IT1 contains the IT16 of TR0 of Je1, etc, IT31 contains IT16 of TR0 of Je31. Then, the second frame TR1 of JSe contains the IT16 of frames TR1 of junctions Je0 to Je31 and so on up to the 32nd frame TR31 of JSe which contains the IT16 of frames TR31 of junctions Je0 to Je31. The same procedure is adopted with JSs.

By means of this process, the 16 frames of a signalling junction comprising 32×32 channels, i.e. 512 channels, can contain up to 1024 signalling data, because each incorporates four bits and each channel thus comprises two signalling data.

The system shown in FIG. 2 comprises a register 10 with 8 bits having serial inputs and parallel outputs, whose input receives the signal JSe from the incoming signalling junction and whose clock input receives the clock signal H0 corresponding to the transmission timing of the bits on the junctions and which is equal to 2 MHz in the present embodiment.

It also comprises a register 11 with four bits with parallel input and parallel outputs, whose inputs are connected to four first outputs of register 10 and whose clock input receives a clock signal H1 whose frequency is quarter that of the clock signal H0, i.e. 500 kHz in the present embodiment.

Register 11 constitutes the data input register from a signalling memory 12, which is a random-access memory of 1024 words of 4 bits, which corresponds to the maximum capacity of the signalling junction. The outputs of this memory 12 are connected to the inputs of a register 13 having four bits with parallel inputs and series outputs, whose clock input receives the signal H0 and whose output supplies the signal JSs from the outgoing signalling junction.

In addition, the system has an addressing multiplexer 14 of the signalling memory, whose outputs are connected to the addressing inputs AD of memory 12, there being 10 such inputs AD because the memory comprises 1024 words. The inputs of multiplexer 14 corresponding to the writing or entering of signalling memory 12 are connected to the outputs of a writing address register 15 and those corresponding to the reading are connected to the outputs of a reading address register 16. Registers 15 and 16 are registers with 10 bits having parallel inputs and outputs and the clock input of each of them receives the clock signal H1. The inputs of register 15 are connected to the outputs of a writing addressing circuit 17 and those of register 16 to the outputs of a reading addressing circuit 18.

The writing addressing circuit 17 firstly has a logic circuit 19 for the detection of the loss and resumption of multi-frame locking, whose 8 inputs are connected to the outputs of register 10. It also has a frame rank memory 20, which is a random-access memory with 32 words of 8 bits, each word corresponding to one of the 32 incoming junctions and is subdivided into two parts, a first part having the first four bits corresponding to the frame rank among the 15 fields of the multi-frame of each of the junctions and a second part having the last four bits corresponding to information regarding to the multi-frame locking, i.e. multi-frame synchronization.

The first four inputs of the frame rank memory 20 are connected to the outputs of a multiplexer 21, whereof four of the eight inputs are connected to four outputs of logic circuit 19 and whereof the control input is connected to another output of logic circuit 19. The first four outputs of memory 20 are connected on the one hand to the four most significant inputs of the writing address register 15 and also to the inputs of an incrementation circuit 22 which increments by one unit the frame rank coded on the four bits which is receives and whose outputs are connected to four other inputs of multiplexer 21.

The four last inputs of the field rank memory 20 are connected to four outputs of logic circuit 19 and the four last outputs are connected to four inputs of logic circuit 19.

Finally, the writing addressing circuit 17 has a counter 23 with 6 bits numbered 0 to 5. On the one hand, the six outputs of counter 23 are connected to the six first inputs of the writing address register and on the other the outputs 1 to 5 are connected to the AD addressing inputs of memory 20. The clock input of counter 23 receives signal H1 and the resetting input the signal S1 synchronized with the incoming junction.

The reading addressing circuit 18 firstly comprises an address memory 24 which is a random-access memory with 1024 words of 10 bits and whose outputs are connected to the inputs of the reading address register 16.

A storage register 25 with 10 bits numbered 0 to 9 receives from the programmed peripheral marking unit the address ITxJe of an incoming channel, the least significant five bits 0 to 4 giving the address of an incoming junction Je among the 32 junctions and the five most significant bits 5 to 9 give the address of one channel ITx among the 32 channels on said junction Je. The $i^{th}$ output of this register 25 (with $0 \leq i \leq 9$) is connected to the $[(i+1) \bmod 10]^{th}$ input of the address memory 24.

In the same way, a storage register 26 with 10 bits numbered 0 to 9 receives from the programmed peripheral marking unit the address of an outgoing channel ITyJs connected to the incoming channel, whose address is contained in register 25, bits 0 to 4 giving the address of one outgoing junction Js among the 32 junctions and bits 5 to 9 giving the address of one channel ITy among the 32 channels on said junction Js.

The ten addressing inputs AD of memory 24 are connected to the outputs of an addressing multiplexer 27. The inputs of multiplexer 27 corresponding to the writing addressing of memory 24 are connected to the outputs of register 26 in which a way that the $i^{th}$ output of this register is connected to the $[(i+1) \bmod 10]^{th}$ addressing input.

The inputs of multiplexer 27 corresponding to the reading addressing of memory 24 are connected to the outputs of a ten bit counter 28, whose clock input receives signal H1, whose resetting input receives S2 synchronized with the outgoing junction, said signal S2 coming from the connection network and whose outputs are connected to the inputs of multiplexer 27 corresponding to the reading addressing of memory 24 in such a way that the $i^{th}$ output of the counter ($0 \leq i \leq 9$) to the $i^{th}$ addressing input.

Finally, memories 12 and 14, as well as the associated addressing multiplexers 14 and 27 in each case receive at their write/read E/L control input the clock signal H1 making it possible to subdivide each 2 μs period into a half-period of 1 μs for the writing and a half-period of 1 μs for the reading. In the same way, the field rank memory 20 receives at its write/read E/L control input a signal H2, whose frequency is half that of signal H1 received by addressing counter 23, i.e. the frequency of H2 is 250 kHz in the present embodiment, so that for each addressing of memory 20 there is a 2 μs half-period for writing and a 2 μs half-period for reading.

The operation of the system shown in FIG. 2 will now be described. The signalling switching system according to the invention firstly comprises writing or entering each signalling information into a signalling memory at an address which is firstly constituted by 4 bits giving the rank of the frame to which the signalling information belongs to JSe, secondly by five bits giving the number of the time-slot or channel to which the signalling information belongs on JSe and thirdly a bit indicating whether the information belongs to part A or part B of the time interval. Finally, the signalling information or data contained in the signalling memory are read so as to reconstitute an outgoing signalling junction JSe in accordance with the details given in the previous table and the corresponding information supplied by the programmed peripheral marking unit.

To obtain the adequate reading address by a simple wired logic, it can be seen from the table that the voice channel number in binary code gives it alone the number of the half-part of the associated field of IT16. Thus, the first bit of the voice channel number in binary code is equal to 0 or 1, depending on whether part A or part B of IT16 is associated and the last four bits give in binary code the field number to which the associated IT16 belongs. Moreover, in view of the structure of the signalling junction, the signalling data relating to the ith incoming or outgoing junction are located in the $i^{th}$ time-slot of the incoming or outgoing signalling junction.

Consequently, during the constitution of the outgoing signalling junction to obtain the signalling information to be placed in the frame number pqrs in time-slot number tuvwx in part number y of JSs (the numbe s being given in binary code and the letters p to y assuming values 0 or 1) knowing that the outgoing channel IthyJs of address ypqrstuvwx is connected to the incoming channel of address jabcdefghi, it is merely necessary to supply abcdefghij as the reading address for the signalling memory.

After describing the operating principle of the signalling switching system, the means for applying this principle will now be described.

At the incoming signalling junction JSe, the bits are transmitted with a timing of 2 MHz, register 10 performs a series-parallel conversion and supplies at the frequency H1 of 500 kHz (500 kHz is equal to 2 MHz divided by four), i.e. every two microseconds, signalling data having four bits to the signalling memory input 12 via register 11.

The data are entered in the signalling memory 12 under the control of a write-read signal which is signal H1, so that during each 2 microsecond period one microsecond is devoted to writing and the other to reading. The data are entered at the writing address defined hereinbefore, said address being processed by the writing circuit 17 and arriving every 2 microseconds at the addressing inputs AD of 12 via multiplexer 14 and register 15, because 14 and 15 receive the clock signal H1 at 500 kHz.

For processing the writing address, the writing circuit must firstly establish the rank of the field in question for each incoming junction. For this reason, it has a circuit 19 for the detection of the loss and resumption of multi-frame locking making it possible to detect the start of the multi-frame as a result of IT 16 of frame TR0 containing the multi-frame locking code and to establish passages from the desynchronized to the synchronized state.

Figure 3:
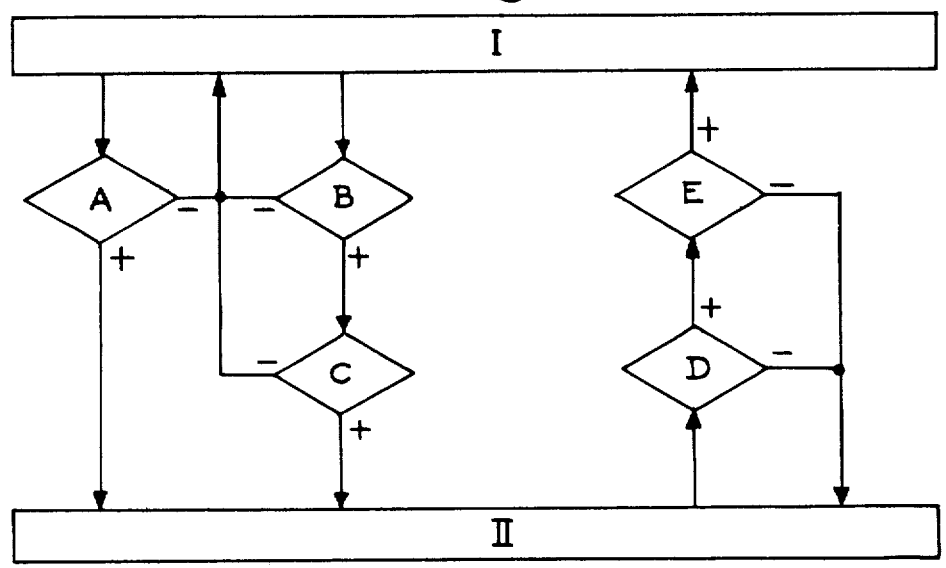
FIG. 3 the flow chart of the multi-frame locking loss and resumption logic.

Multi-frame locking loss and resumption are defined in CCITT notice G 732, section 4.2.3 and are indicated in the algorithm of FIG. 3 in which state I is the synchronized state and state II the desynchronized state.

In the synchronized state I, the question A is asked "Are all the bits of IT 16 of a multi-frame equal to 0?". If the answer is negative (−) there is still a synchronized state, but if the answer is positive (+) there has been a transfer from the synchronized state to the desynchronized state II.

In the synchronized state I question B is asked "Is the IT16 of a field TR0 different from 0?". If the answer is negative (−) there is still a synchronized state, but if the answer is positive (+) the question C is asked "Is the IT16 of the following field TR0 different from 0?". If the answer is no (−) the state is still synchronized, whereas if the answer is yes (+) there has been passage from the synchronized state I to desynchronized state II.

If in the desynchronized state II the question D is asked "Is the IT16 of one field different from 0?" and the answer is negative (−) desynchronization still exists, but if the answer is positive (+) question E is asked "Is the IT16 A of the following frame equal to 0?". If the answer is negative (−) the state is still desynchronized, but if the answer is positive (+) there has been a transfer from the desynchronized state II to the synchronized state I.

This algorithm is produced by circuit 19 associated with the second part of memory 20, whereof each word corresponds to an incoming junction. The four last bits of the words contained in memory 20 have the following means: the fifth signifies "junction synchronized or not" the sixth signifies "IT16 of one frame TR0 does or does not differ from 0", the seventh signifies "the IT16 of one field does or does not differ from 0" and the eighth gives the partial logic sum of the IT16 in the multi-frame taking place.

The field rank memory 20 is read every four microseconds, because the read—write control input receives the signal H2 of frequency 250 kHz. Furthermore, in view of the addressing of memory 20, the same address is present at the inputs AD of 20 during each 4 microsecond period which is broken down into two microseconds for reading and two microseconds for writing.

Whenever an incoming junction passes from the desynchronized state to the synchronized state logic 19, via multiplexer 21, enters the frame rank in the first part of memory 20 at the address corresponding to this incoming junction.

In the synchronized state of a junction, after reach corresponding frame rank reading, the field rank which has just been read, incremented by one unit for circuit 22 is entered at the same address, multiplexer 21 being positioned by logic 19 in such a way that the signals from circuit 22 are at the input of the first part of memory 20.

Thus, the first part of the writing address is established, which indicates the frames rank by means of four bits. The six other bits of the writing address are supplied by the outputs of counter 23. On the one hand, outputs 1 to 5 give the rank of the time-slot present at the input on JSe (synchronism being ensured by signal S1), i.e. in view of the constitution of the signalling channel the rank of the incoming junction, and on the other hand output 0 indicates that it is the first part A or the second part B of the time—slot The signalling data area read into the signalling memory 12 during each half-period of 1 microsecond devoted to reading. The data are read at the reading address defined hereinbefore and which is processed by the reading circuit 18, reaching the addressing inputs AD of 12 via multiplexer 14 and register 16 every 2 microseconds, because 14 and 16 receive the clock signal H1 at 500 kHz.

The reading address processing means according to the principle described hereinbefore comprise writing into the address memory 24 the word abcdefghij corresponding to the incoming channel ITxJe of address jabcdefghi and obtained by means of the wiring referred to hereinbefore between the outputs of register 25 containing the address of ITxJe and to the outputs of memory 24. At the address pqrstuvwxy corresponding to the outgoing junction channel ITyJs of address ypqrstuvwx and obtained by means of the wiring described hereinbefore between the outputs of the register 26 containing the address of ITyJs and the inputs of the addressing multiplexer corresponding to the writing.

When the correspondence data between incoming and outgoing channels are in this way entered in address memory 24, the outgoing signalling channel is formed by the addressing in reading of memory 24 by output signals from counter 28 synchronized with the connection network by means of signal S2.

Figure 4:
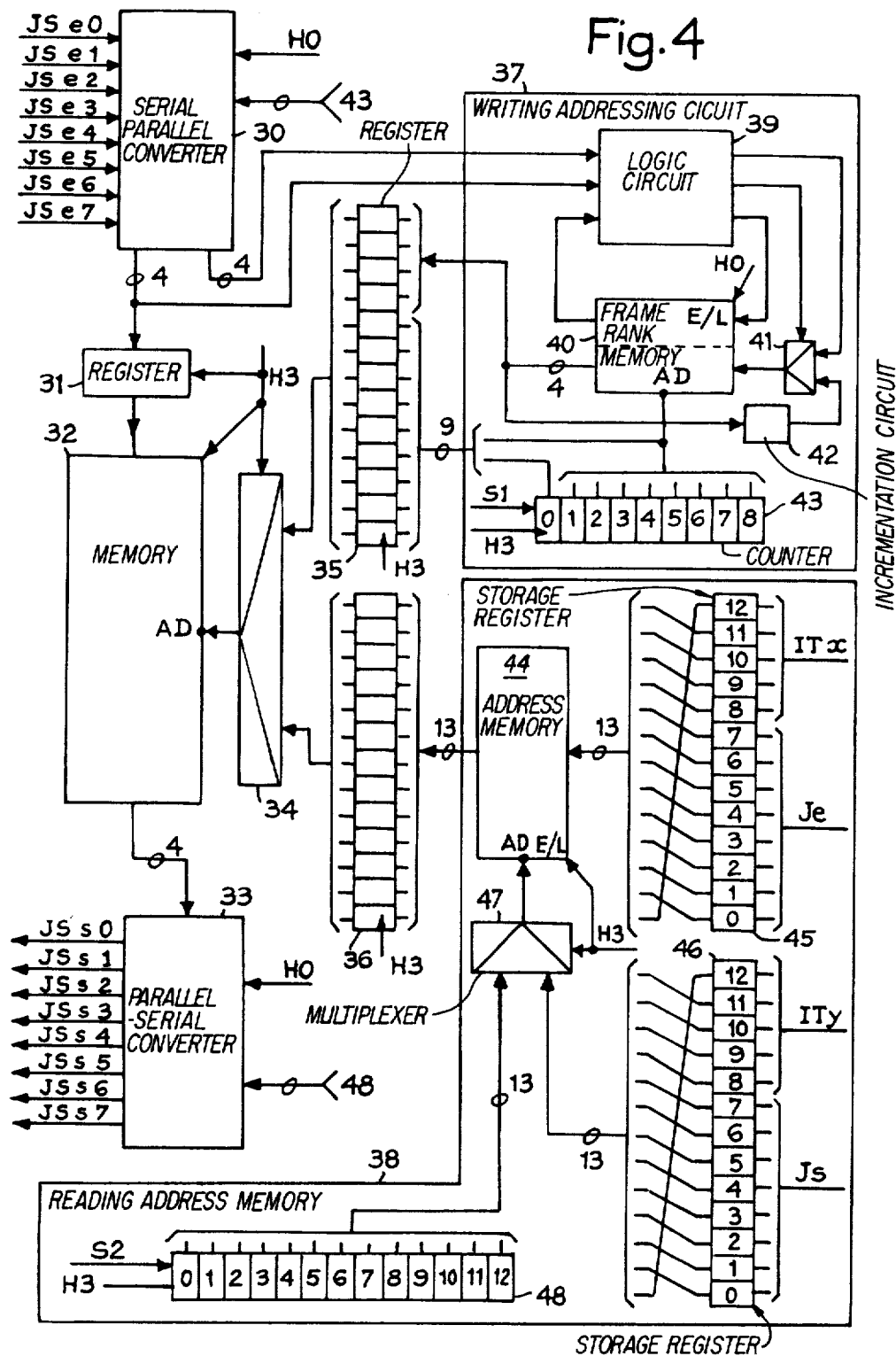
FIG. 4 an embodiment of the signalling switching system in a network having at the most 256 incoming junctions and 256 outgoing junctions, with 8 signalling incoming junctions and 8 signalling outgoing junctions.

FIG. 4 shows an embodiment having the same principle as that described hereinbefore, but which is adapted to a number N of incoming junctions and outgoing junctions exceeding 32 and at the most equal to 256.

The incoming junctions can contain up to 8 times more (256 is equal to 8×32) signalling data than in the previous embodiment, so that in this case 8 signalling junctions are used, i.e. 8 incoming junctions JSe0 to JSe7 and 8 outgoing junctions JSs0 to JSs7. These junctions are formed in the same way as junction JSe, junction JSei (i=0 to 7) containing the signalling data of incoming junctions Je (32i) to Je (32i+31) and junction JSsi (i=0 to 7) containing those of the outgoing junctions Js (32i) to Js (32 i+31). FIG. 4 shows the modifications making it possible to pass from 32 to 256 junctions.

The system has an input circuit which is a serial-parallel converter 30, whose inputs are connected to the incoming signalling junctions JSe0 to JSe7 and which receives the clock signal H0, a register 31 identical to register 11 in FIG. 2, whereof the four inputs are connected to four outputs of converter 30 and which receives in clock inputs a clock signal H3 of frequency 4 Hz eight times higher than that received by register 21, because there is eight times more data during a given time.

In addition, the system has a signalling memory with 8192 (8×1024) words of four bits, whereof the inputs are connected to the outputs of register 31, whose read/write control input E/L receives signal H3 and whose outputs are connected to the inputs of a serial-parallel converter 33, whose outputs supply the outgoing signalling junctions JSs0 to JSs7 and which receives the clock signal H0.

The thirteen addressing inputs AD of the signalling memory 32 are connected to the outputs of a multiplexer 34, whose control input receives signal H3, whose inputs corresponding to writing being connected to the outputs of a writing address register 35 having thirteen bits and whose inputs corresponding to reading are connected to the outputs of a reading address register 36 having thirteen bits.

The inputs of register 35 are connected to the outputs of a writing addressing circuit 37, those of register 36 are connected to the outputs of a reading addressing circuit 38 and the clock output of each of these registers receives the clock signal H3.

The writing addressing circuit 37 has a logic circuit 39 for the detection of multiframe locking loss and resumption, identical to logic circuit 19 and whose 8 inputs are connected to the outputs of register 30. Moreover, it has a frame rank memory 40 which is a random-access memory of 256 (8×32) eight bit words, each word corresponding to one of the 256 incoming junctions, whose read/write control inputs E/L receives the clock signal H0, a multiplexer 41 identical to multiplexer 21 and an incrementation circuit 42 identical to circuit 22, the connections between elements 39, 40, 41 and 42 being identical to those between elements 19, 20, 21 and 22.

Finally, circuit 37 has a counter 43 with nine bits numbered 0 to 8. On the one hand, the nine outputs of counter 43 are connected to nine least significant inputs of the writing address register and on the other hand outputs 1 to 8 are connected to the addressing inputs AD of memory 40. The clock input of counter 43 receives signal H3 and the resetting input the synchronizing signal S1 with the incoming junctions.

The reading addressing circuit 38 formally comprises an address memory 44, which is a random-access memory of 8192 (8×1024) words of 13 bits and whose outputs are connected to the inputs of the reading address register 36.

A storage register 45 of thirteen bits numbered 0 to 12 receives from the programmed peripheral marking unit the address of an incoming channel ITxJe, the eight least significant bits 0 to 7 giving the address of an incoming junction Je among 256 junctions and the five most significant bits give the address of a channel ITx among 32 channels at junction Je. The ith output of register 45 (with $0 \leq i \leq 12$) is connected to the $[(i+1) \text{modulo } 13]^{th}$ input of the address memory 44.

In the same way, a storage register 46 with thirteen bits numbered 0 to 12 receives from the programmed peripheral marking unit the address of an outgoing channel ITyJs connected to the incoming channel, whose address is contained in register 45, the eight lowest weight bits 0 to 7 giving the address of one outgoing channel Js among 255 junctions and the five highest weight bits 8 to 12 give the address of one channel ITy among 32 channels on said junction Js.

The thirteen addressing inputs AD of memory 44 are connected to the outputs of an addressing multiplexer 47. The inputs of the addressing multiplexer 47 corresponding to the addressing in writing are connected to the outputs of register 26 in such a way that the $i^{th}$ output of this register 46 (with $0 \leq i \leq 12$) is connected to the $[(i+1) \text{modulo } 13]^{th}$ addressing input.

The inputs of multiplexer 47 corresponding to the addressing in reading of memory 44 are connected to the outputs of a thirteen bit counter 48, whose clock input receives signal H3, whose resetting input receives the synchronizing signal S2 with the outgoing junctions and whose outputs are connected to the inputs of multiplexer 47 corresponding to the addressing in reading in such a way that the $i^{th}$ output of the counter is connected to the ith addressing input (with $0 \leq i \leq 13$).

Finally, the read/write control input E/L of memory 44 and control input of multiplexer 47 receive clock signal H3.

As the operation of the embodiment of FIG. 4 is identical to that of FIG. 2, only converters 33 and 30 will be described, because only these require additional explanations. The problems arising from serial-parallel and parallel-serial conversion under the system conditions are solved, for example, by the converters diagrammatically shown in FIGS. 5 and 6.

Figure 5:
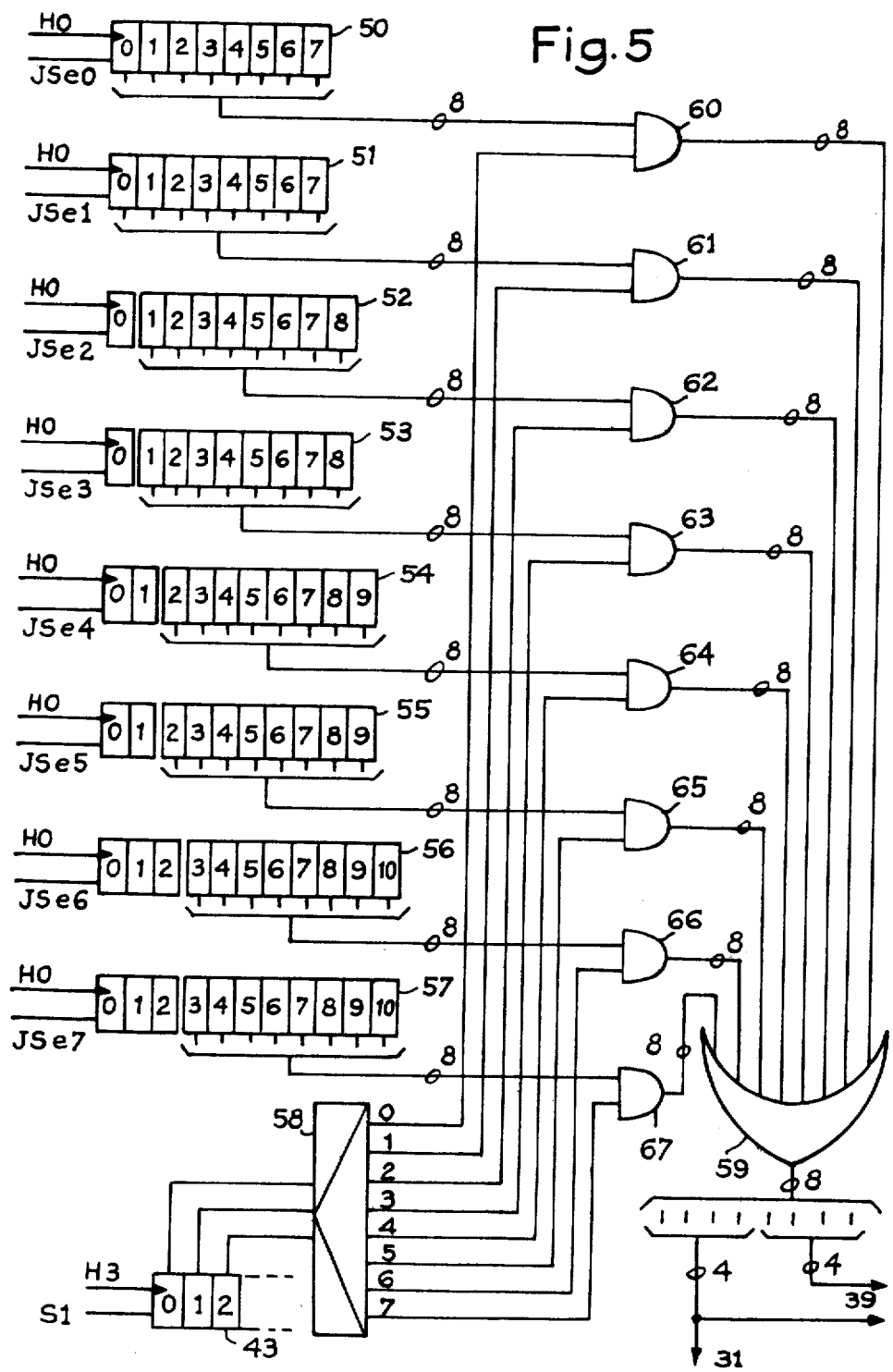
FIG. 5 a serial—parallel converter which is an embodiment of an input circuit of the system shown in FIG. 4.

FIG. 5 shows a serial-parallel converter 30 having a group of eight shift registers 50 to 57 with a series input and eight parallel outputs, whose inputs are respectively connected to the junctions JSe0 to JSe7 and whose clock inputs receive signal H0. Registers 50 and 51 have eight bits, registers 52 and 53 nine bits, registers 54 and 55 ten bits and registers 56 and 57 eleven bits, the eight most significant bits of each register being those available at the eight outputs.

The outputs of each register are respectively connected to the AND logic gates 60 to 67, which are in each case the symbolic representation of a group of eight logic AND gates and whereof the other inputs are connected to the outputs of a decoder 58. Decoder 58 has three inputs respectively connected to the outputs 0, 1 and 2 of counter 43 of the writing circuit and eight outputs 0 to 7 respectively connected to the logic AND gates 60 to 67, which it "opens" in cyclic order every 250 ns, because counter 43 receives H3 as the clock signal (4 MHz). A symbolically represented logic OR gate 59 has eight × eight inputs, connected to eight outputs of each of the eight AND gates 60 and 67 and eight outputs connected to logic 39 and where of the first four outputs are also connected to the inputs of register 31.

In registers 50 to 57, the data are shifted with timing H0 (2 MHz) of their arrival at the junctions. Every four elementary times, i.e. 4×500 ns, a half-time interval, i.e. one signalling information is available at the output of each register.

During a first 500 ns period, decoder 58 successively "opens" gates 60 and 61. At the end of this first period, there is a further shift and the half-time intervals advance by one bit in each register, half-time intervals then being available at the outputs of registers 52 and 53.

During a second 500 ns period, decoder 58 successively "opens" gates 62 and 63. At the end of this second period, a further shift occurs and the half-time intervals again advance by one bit in each register, half-time intervals then being available at the outputs of registers 54 and 55.

During a third 500 ns period, decoder 58 successively "opens" gates 64 and 65. At the end of this third period, a further shift occurs and the half-time intervals again advance by one bit in each register, half-time intervals then being available at the outputs of registers 56 and 57.

During a fourth 500 ns period, decoder 58 successively "opens" gates 66 and 67. At the end of this fourth period, a further shift occurs and the half-time intervals again advance by one bit in each register.

At the end of this fourth period, there are new half-time intervals in the first four bits of each register and the situation is the same as that preceding the first period and so on. Furthermore, at the output of each AND gate, there is a single half-time interval available every 4×500 ns for the signalling memory 32 via register 31 and at the output of the OR gate 59 there is a half-time period available every 250 nanoseconds $$\left( \frac{4 \times 500 \text{ns}}{8} \right)$$

for memory 32, which corresponds to a timing of 4 MHz, i.e. the frequency of H3.

Figure 6:
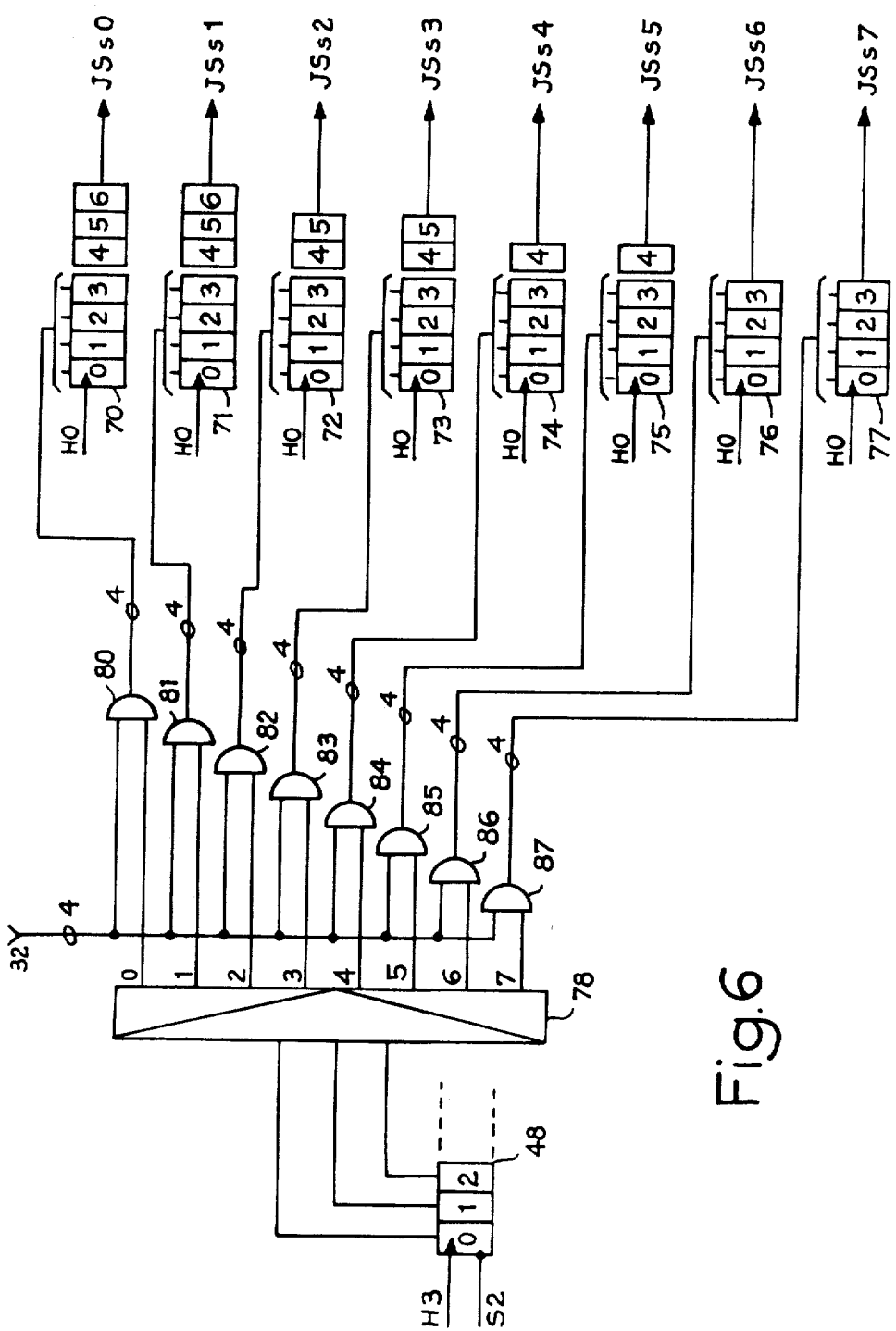
FIG. 6 a serial—parallel converter which is an embodiment of the output circuit of the system shown in FIG. 4.

FIG. 6 shows a parallel—serial converter 33 having a system of eight shift registers 70 to 74 with four parallel inputs and a serial output, whose outputs are respectively connected to junctions JSs0 to JSs7 and whose clock inputs receive the signal H0. Registers 70 and 71 have seven bits, registers 72 and 73 six bits, registers 74 and 75 five bits and registers 76 and 77 four bits, the four least significant bits 0 to 3 of each register being those which receive the input signals.

The inputs of each register are respectively connected to the outputs of the logic AND gates 80 to 87, each symbolically representing four logic AND gates and whose inputs are connected on the one hand to the outputs of the signalling memory 32 which supplies a half-interval every 250 nanoseconds (ns) and on the other hand to the outputs of a decoder 78. This decoder 78 has three inputs connected to the outputs 0 to 2 of counter 48 of reading circuit 38 and has four outputs 0 to 7 respectively connected to the logic AND gates 80 to 87, which it cyclically opens in turn every 250 ns, because counter 48 receives as the clock signal, signal H3 of frequency 4 MHz.

During a first 500 ns period of transmission timing H0 on JSs0 to JSs7, decoder 78 successively opens gate 80 and gate 81, which has the effect of storing two half-time intervals from memory 32 respectively in the four least significant bits 0 to 4 of registers 70 and 71. At the end of this first period, a shift occurs and the half-time intervals advance by one bit in each register.

During a second 500 ns period, decoder 78 successively "opens" gate 82 and gate 83, which has the effect of storing the two half-time intervals from memory 32 respectively in the four least significant bits 0 to 4 of registers 72 and 73. At the end of this second period, a shift occurs and the half-time slot advance again by one bit in each register.

During a third 500 ns period, decoder 78 successively "opens" gates 84 and 85, which has the effect of storing two half-time slot from memory 32 respectively in the four least significant bits 0 to 4 of register 74 and 75. At the end of this third period, a shift occurs and the half-time slot advance again by one bit in each register.

During a fourth 500 ns period, decoder 78 successively "opens" gates 86 and 87, which has the effect of storing to half-time intervals respectively in registers 76 and 77.

At the end of this fourth period, a shift occurs and the half-time slot advance again by one bit in each register, which has the effect of simultaneously obtaining on all the junctions JSs0 to JSs7 the first bit of a half-time slot serial available and of freeing the first four bits of registers 70 and 71 and permitting the start of a new cycle because the situation is the same as that preceding the first period and so on.

What is claimed is:

1. A signaling switching system in a time switching network, said network being provided with at least one central computer and a peripheral marking unit by means of which correspondence data between incoming and outgoing junction channels is supplied, said marking unit being connected on the one hand by a busbar to said central computer and on the other hand to a connection network to which it supplies the addresses of two connected channels, firstly that of an incoming channel ITxJe designating the x-th channel of the e-th incoming junction and the second that of an outgoing channel ITyJs designating the y-th channel of the s-th junction, said connection network permitting the exchange of calls between N incoming junctions and N outgoing junctions (J0 to J(N−1)) said switching system forming a multi-frame of p frames, connected to said time switching network, and which supplies and receives in the form of n incoming signaling junctions (JSe) and n outgoing signaling junctions (JSs) of the network, whose frames contain the signaling data of z bits at the rate of r per junction (n being the integer immediately higher or equal to N/r said switching system also provided with a microcomputer fulfilling the function of a signaling receiving and transmitting unit, connected to said central computer, said signal switching system being constituted by a wired logic having on the one hand n inputs connected to the incoming signaling junctions (JSe) and n outputs connected to the outgoing signaling junctions (JSs) and on the other hand two inputs connected to two outputs of the peripheral marking unit supplying to the first input the address of a channel of an incoming junction (ITxJe) and at the second input the address of the channel of the outgoing junction (ITyJs) to which the channel of the incoming junction (ITxJe) is connected, said wired logic being constituted by an input circuit whose n inputs are connected to the n incoming signaling junctions on which the signaling data are transmitted in series mode with timing H0 and which supplies signaling data to z outputs in parallel with timing n·H0/z, a storage register with z bits, whose z inputs are connected to the z outputs of the input circuit and whose clock input receives the clock signal of frequency n·H0/z, a random-access signaling memory of Nxr words of z bits, whose z inputs are connected to the z outputs of the storage register and which receives the said signaling data, an output circuit whose z inputs are connected to the z outputs of the signaling memory and receive the signaling data in parallel with timing n·H0/z, and whose n outputs supply the n outgoing signaling junctions on which the data are serially transmitted with timing H0, and addressing multiplexer whose outputs are connected to the m addressing inputs of the signaling memory with m equal to log$_2$ (Nxr), a writing address register whose m ouputs are connected to the inputs of the addressing multiplexer corresponding to writing, a writing addressing circuit whose inputs are connected to the outputs of the input circuit and whose m outputs are connected to the writing address register, a reading address register whose m outputs are connected to the inputs of the addressing multiplexer corresponding to reading and a reading addressing circuit whose inputs are connected to the peripheral marking units and whose m outputs are connected to the inputs of the reading address register.

2. A system according to claim 1, the incoming and outgoing junctions of the network of the MIC type having a multi-frame formed by 16 frame, each frame having 32 channels or time-slot of 8 bits each, the transmission frequency H0 being 2 MHz, r being equal to 32 and z being equal to 4 because each signalling channel has two signalling data, wherein the writing addressing circuit has means for detecting the multi-frame locking loss and resumption constituted on the one hand by a logic circuit and by an input multiplexer whose 8 inputs of the logic circuit are connected to the outputs of the input circuit and whereof four outputs are connected to a first part of the inputs of the frame rank input multiplexer and whereof a fifth output is connected to the control input of the multiplexer, and on the other hand by a random-access memory of N words of four bits, whereof four inputs and four outputs are respectively connected to four inputs and four outputs of the logic circuit, means for the storage of the frame rank on each incoming signalling junction constituted by a random-access memory of N words of four bits, whose inputs are connected to the outputs of the frame rank input multiplexer and whose four outputs are connected to the four inputs of the writing address register corresponding to the four most significant bits, rank incrementation means whose inputs are connected to the outputs of the storage means and whose outputs are connected to the second part of the inputs of the frame rank input multiplexer, means for counting the incoming half-channels, constituted by a counter with (m−4) bits receiving a synchronizing signal with incoming signalling junctions from the connection network, whose clock input receives the clock signal of frequency (n·H0)/(z), i.e. n·500 kHz and whereof the (m−4) outputs are connected to (m−4) most significant inputs of the writing address register, the (m−5) most significant outputs also being connected on the one hand to the addressing inputs of the said memory thereof of the multi-frame locking loss and resumption detection means and on the other to the addressing inputs of the frame rank storage means.

3. A system according to claim 2, wherein a random-access memory of N words of 8 bits contains the said memory of the frame locking loss and resumption detection means and the frame rank memory.

4. A system according to claim 2, wherein the reading addressing circuit has means for storing the address of one channel of an incoming junction (ITxJe) constituted by a storage register of m bits, whereof the m inputs are connected to the peripheral marking unit, the five most significant inputs receiving the address of channel (ITx), the (m−5) least significant inputs receiving the address of the junction (Je), means for storing the address of the outgoing junction channel (ITyJs) to which the incoming junction channel (ITxJe) is connected, said means being constituted by a storage register of m bits, whereof the m inputs are connected to the peripheral marking unit, the five most significant inputs receiving the address from channel (ITy), the (m−5) least significant inputs receiving the address from junction (Js), address storage means constituted by a random-access memory of Nxr words of m bits, whose outputs are connected to the m inputs of the reading address register and whose inputs are connected to the outputs of the register for storing the address of channel (ITxJe), the $i^{th}$ output of the said register being connected to the $[(i+1)\text{modulo } m]^{th}$ input of said memory, the inputs and respectively the outputs being numbered from 0 to (m−1), passing from the least significant to the most significant, an addressing multiplexer of the address storage means, whose m outputs are connected to the m addressing inputs of the address storage means and whereof a first part of the inputs is connected to the m outputs of the storage register (ITyJs), the ith output of the register being connected to the input corresponding to the $[(i+1)\text{modulo } m]^{th}$ addressing inputs, the inputs and respectively the outputs being numbered 0 to (m−1), passing from the least significant to the most significant, means for counting the outgoing half-channels, constituted by a counter with m bits receiving a synchronizing signal for an outgoing junction from the connection network, whose clock input receives the clock signal of frequency (n·H0/z), i.e. n×500 kHz and whose m inputs are connected to the second part of the inputs of the addressing multiplexer of the address storage means, the $i^{th}$ output being connected to the $i^{th}$ input with i varying from 0 to (m−1).

5. A system according to claim 4, wherein N is equal to 32 and n to 1 and consequently Nxr is equal to 1024 and m to 10, wherein the input circuit is a shift register with eight bits having a serial input and eight parallel outputs, whose clock input receives a clock signal at 2 MHz, whose input is connected to the incoming signalling junction (JSe) and whose outputs are connected to the said multifield locking loss and resumption detection means, the first four also being connected to the inputs of the input storage register of the signalling memory and wherein the output circuit is a shift register with four bits having parallel inputs connected to the outputs of the signalling memory and with a serial output connected to the outgoing signalling junction (JSs), the clock input receiving the clock signal at 2 MHz.

6. A system according to claim 4, wherein N is equal to 256 and n to 8 and consequently Nxr is equal to 4096 and m to 13, wherein the input circuit is a serial-parallel converter constituted by a system of eight shift registers with a serial input and parallel outputs receiving the said clock signal at 2 MHz and whose inputs are respectively connected to the incoming signalling junctions (JSe0 to JSe7), the two first registers having eight bits, the third and four 9 bits, the fifth and sixth 10 bits and the seventh and eighth 11 bits, a decoder whose three inputs are connected to the three least significant outputs of the counter belonging to said writing addressing circuit, eight systems of eight logic AND gates, each of them being connected on the one hand to eight outputs, i.e. the eight most significant bits of one of the eight shift registers and on the other hand to the corresponding output of the decoder, a logic OR gate whose eight×eight inputs are connected to the eight outputs of each of the eight systems of AND gates and whose eight outputs are connected on the one hand to the writing addressing circuit and on the other to the signalling memory in the case of four of them and wherein the output circuit is a parallel-serial converter constituted by a decoder whose three inputs are connected to the three least significant outputs of the counter of the reading addressing circuit, eight systems of four logic AND gates, each of them being connected on the one hand to the four outputs of the signalling memory and on the other to one of the eight outputs of the decoder, a system of eight shift registers numbered 0 to 7 with parallel inputs and a serial output, receiving the clock signal at 2 MHz, the first two registers 0 and 1 having seven bits, the third and fourth 2 and 3 six bits, the fifth and sixth 4 and 5 five bits, the seventh and eighth 6 and 7 four bits, the four inputs, i.e. the four least significant bits of register i (i=0 to 7) being connected to the four outputs of the AND gate system which is connected to the output of the decoder corresponding to the decoding of i in binary code and the output of register i being connected to the $i^{th}$ outgoing signalling junction (JSsi).

* * * * *